United States Patent
Hiraoka et al.

(10) Patent No.: US 9,759,178 B2
(45) Date of Patent: Sep. 12, 2017

(54) PLUG BUILT-IN TYPE OPTICAL MEASUREMENT PROBE, AND OPTICAL MEASUREMENT DEVICE PROVIDED WITH THE SAME

(71) Applicants: SHIMADZU CORPORATION, Kyoto-shi, Kyoto (JP); HONDA MOTOR CO., LTD., Tokyo (JP)

(72) Inventors: Ryoji Hiraoka, Hirakata (JP); Nobuyuki Iwai, Kyoto (JP); Tetsuya Nagai, Nishinomiya (JP); Isao Azumagakito, Wako (JP); Satoru Okada, Wako (JP)

(73) Assignees: SHIMADZU CORPORATION, Kyoto-shi (JP); HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 14/460,818

(22) Filed: Aug. 15, 2014

(65) Prior Publication Data

US 2015/0054514 A1 Feb. 26, 2015

(30) Foreign Application Priority Data

Aug. 26, 2013 (JP) .................................. 2013-174395

(51) Int. Cl.
*F02P 17/00* (2006.01)
*F02P 17/12* (2006.01)
(Continued)

(52) U.S. Cl.
CPC .............. *F02P 17/12* (2013.01); *G01L 23/06* (2013.01); *H01T 13/40* (2013.01)

(58) Field of Classification Search
CPC .................................. F01P 17/12; H01T 13/40
(Continued)

(56) References Cited

U.S. PATENT DOCUMENTS 5,059,027 A * 10/1991 Roesler ................... G01J 3/453
  356/456
5,961,314 A * 10/1999 Myhre ................. F01D 21/003
  250/206

(Continued)

FOREIGN PATENT DOCUMENTS

CH WO 2006037251 A1 * 4/2006 ............. G01L 23/16
JP  S62-9391 U  1/1987
(Continued)

OTHER PUBLICATIONS

Office Action dated May 31, 2016, issued in counterpart Japanese Patent Application No. 2013-174395, with English translation. (8 pages).

*Primary Examiner* — Jermele M Hollington
*Assistant Examiner* — Sean Curtis
(74) *Attorney, Agent, or Firm* — Westerman, Hattori, Daniels & Adrian, LLP

(57) ABSTRACT

There are provided a plug built-in type optical measurement probe capable of obtaining a more accurate measurement value, and an optical measurement device provided with the same. A spark section and a light receiving section are held by a plug main body while being arranged next to each other in a protruding manner such that an end face of a holder is arranged at a position where discharge light from the spark section does not enter the field of view of the light receiving section. Accordingly, the light receiving section can be held in a manner protruding from the plug main body, and entering of the discharge light from the spark section can be restricted by the holder of the light receiving section. That is, by arranging the end face of the holder at a position where the discharge light from the spark section does not enter the field of view of the light receiving section, the light receiving intensity of the discharge light from the spark section can be prevented from being added to a measurement value, and (Continued)

it is possible to measure only the light generated at the time of combustion, and thus, a more accurate measurement value can be obtained.

8 Claims, 4 Drawing Sheets

(51) Int. Cl.
  *H01T 13/40* (2006.01)
  *G01L 23/06* (2006.01)
(58) Field of Classification Search
  USPC .......................................................... 324/393
  See application file for complete search history.

(56) References Cited

U.S. PATENT DOCUMENTS

| | | | | |
|---|---|---|---|---|
| 7,696,679 B2* | 4/2010 | Karst | ................ | G01L 23/16 313/129 |
| 8,616,006 B2* | 12/2013 | Rocci Denis | ............. | F02C 7/24 60/39.821 |
| 2008/0022992 A1* | 1/2008 | Wahl | ................ | B08B 17/06 126/200 |
| 2009/0002684 A1* | 1/2009 | Sanders | ................ | G01J 3/02 356/51 |
| 2010/0055001 A1* | 3/2010 | Ikeda | ................ | G01N 21/71 422/108 |
| 2012/0131926 A1* | 5/2012 | Kopecek | ................ | F02P 23/04 60/776 |
| 2012/0131927 A1* | 5/2012 | Denis | ................ | F02C 7/24 60/776 |
| 2012/0143458 A1* | 6/2012 | Winklhofer | ........... | F02D 35/022 701/99 |
| 2015/0085283 A1* | 3/2015 | Nagai | ................ | G01D 5/353 356/326 |

FOREIGN PATENT DOCUMENTS

| | | | | |
|---|---|---|---|---|
| JP | S63-250532 A | 10/1988 | | |
| JP | 2006-292524 A | 10/2006 | | |
| JP | 2011102589 A | * 5/2011 | ............ | G01L 23/16 |
| JP | 2011-241753 A | 12/2011 | | |
| JP | 2012-118080 A | 6/2012 | | |
| JP | 3182445 U | 3/2013 | | |

* cited by examiner

PLUG BUILT-IN TYPE OPTICAL MEASUREMENT PROBE, AND OPTICAL MEASUREMENT DEVICE PROVIDED WITH THE SAME

BACKGROUND OF THE INVENTION

Field of the Invention

The present invention relates to an optical measurement probe for guiding light generated at a time of combustion to an appliance, and an optical measurement device provided with the same, and more particularly, to a plug built-in type optical measurement probe including a spark section for performing ignition by spark discharge between electrodes, and an optical measurement device provided with the same.

Description of the Related Art

For example, at the time of evaluating the combustion state in a combustion chamber of an internal combustion engine of a car, measurement is performed using an optical measurement probe for guiding light generated at the time of combustion to an appliance (for example, see JP-A-2012-118080, and JP-A-2011-241753). As an example of such an optical measurement probe, a plug built-in type optical measurement probe including a spark section for performing ignition by spark discharge between electrodes has been known (for example, see JP-A-2006-292524).

As illustrated in FIG. 1 of JP-A-2006-292524, in a plug built-in type optical measurement probe, a light receiving section structured by an optical element or the like is held by a plug main body (an insulator section) together with the spark section. Light generated in a combustion chamber at the time of combustion by spark discharge of the spark section enters from an incidence surface of the light receiving section, and is guided to an appliance by a light guide formed of an optical fiber, for example.

Due to design restrictions based on standards, the shape of the plug main body cannot be made too large. Accordingly, in the case of integrally holding the light receiving section and the spark section by the plug main body, the light receiving section and the spark section have to be held relatively close to each other, as illustrated in FIG. 1 of JP-A-2006-292524.

SUMMARY OF THE INVENTION

In the example of FIG. 1 of JP-A-2006-292524, the light receiving section is attached to the plug main body in such a way that the incidence surface of the light receiving section is flush with an end face of the plug main body. On the other hand, the spark section is provided in a manner protruding from the end face of the plug main body. Thus, there is a possibility that discharge light from the spark section enters from the incidence surface of the light receiving section, and is guided to an appliance by the light guide.

That is, not only the combustion light inside the combustion chamber, which is a measurement target, but also the discharge light from the spark section may enter the light receiving section, and the light receiving intensity of the discharge light may be added to the measurement value. In this case, there is a problem that accurate measurement of only the combustion light in the combustion chamber, which is the measurement target, is not performed.

Also, in a case where the incidence surface of the light receiving section looks into a combustion chamber of an internal combustion engine of a car, soot, engine oil and the like floating in the combustion chamber at the time of combustion come into contact with the incidence surface of the light receiving section. Accordingly, dirt including soot, engine oil and the like may adhere to the incidence surface of the light receiving section, and the adhered matter may affect the measurement value.

Thus, maintenance of wiping off dirt adhered to the incidence surface of the light receiving section is possibly performed regularly, but considering the burden on the worker, a structure allowing such maintenance to be easily performed is desirable.

The present invention has been made in consideration of the above circumstances, and has its object to provide a plug built-in type optical measurement probe capable of obtaining a more accurate measurement value, and an optical measurement device provided with the same. Also, the present invention has its object to provide a plug built-in type optical measurement probe allowing maintenance to be easily performed, and an optical measurement device provided with the same.

A plug built-in type optical measurement probe according to the present invention comprises a spark section, a light receiving section and a plug main body. The spark section is for performing ignition by spark discharge between electrodes. The light receiving section includes an optical window through which light generated at a time of combustion enters and a light-blocking holder for accommodating the optical window at an end portion, and is for receiving light, within a field of view, transmitted through the optical window. The plug main body is for holding, next to each other, the spark section and the light receiving section in a protruded manner so that an end face of the holder is arranged at a position where discharge light from the spark section does not enter the field of view of the light receiving section.

According to such a structure, the light receiving section can be held in a manner protruding from the plug main body, and entering of the discharge light from the spark section can be restricted by the holder of the light receiving section. That is, by arranging the end face of the holder at a position where the discharge light from the spark section does not enter the field of view of the light receiving section, the light receiving intensity of the discharge light from the spark section can be prevented from being added to a measurement value, and it is possible to measure only the light generated at the time of combustion, and thus, a more accurate measurement value can be obtained.

The holder may be formed to be cylindrical, a concave portion having an inner diameter corresponding to an outer diameter of the optical window may be formed at one end portion of the holder, and the optical window may be accommodated inside the concave portion.

Also, an incidence surface of the optical window may protrude from the end face of the holder.

According to such a structure, by holding the light receiving section in a manner protruding from the plug main body, and by causing the incidence surface of the optical window to protrude from the end face of the holder, in the case where dirt is adhered to the incidence surface, the dirt can be easily wiped off. Accordingly, maintenance can be performed with ease.

As described above, even if the incidence surface of the optical window protrudes from the end face of the holder, the field of view of the light receiving section can be restricted depending on the position of the end face of the holder, and thus, entering of the discharge light from the spark section can be desirably restricted, and a more accurate measurement value can be obtained.

Furthermore, the spark section may include a center electrode, and a side electrode protruding laterally to the center electrode from an end face of the plug main body in an L-shaped manner, and the light receiving section may be provided at a position where the side electrode does not come between the light receiving section and the center electrode.

An optical measurement device according to the present invention comprises the plug built-in type optical measurement probe and a detector for detecting light guided by the plug built-in type optical measurement probe.

Also, an optical measurement device according to the present invention comprises the plug built-in type optical measurement probe, wherein the plug built-in type optical measurement probe is attached to a cylinder head of an internal combustion engine in such a way as to look into a combustion chamber that is a measurement target.

The plug built-in type optical measurement probe may be provided in an opening formed on an opposite side, across a cylinder center, of a valve system interlocking member accommodation chamber provided on the cylinder head.

According to the present invention, the light receiving intensity of the discharge light from the spark section can be prevented from being added to a measurement value, and it is possible to measure only the light generated at the time of combustion, and thus, a more accurate measurement value can be obtained. Also, by causing the incidence surface of the optical window to protrude from the end face of the holder, in the case where dirt is adhered to the incidence surface, the dirt can be easily wiped off. Accordingly, maintenance can be performed with ease.

DETAILED DESCRIPTION OF THE PREFERRED EMBODIMENTS

Figure 1:
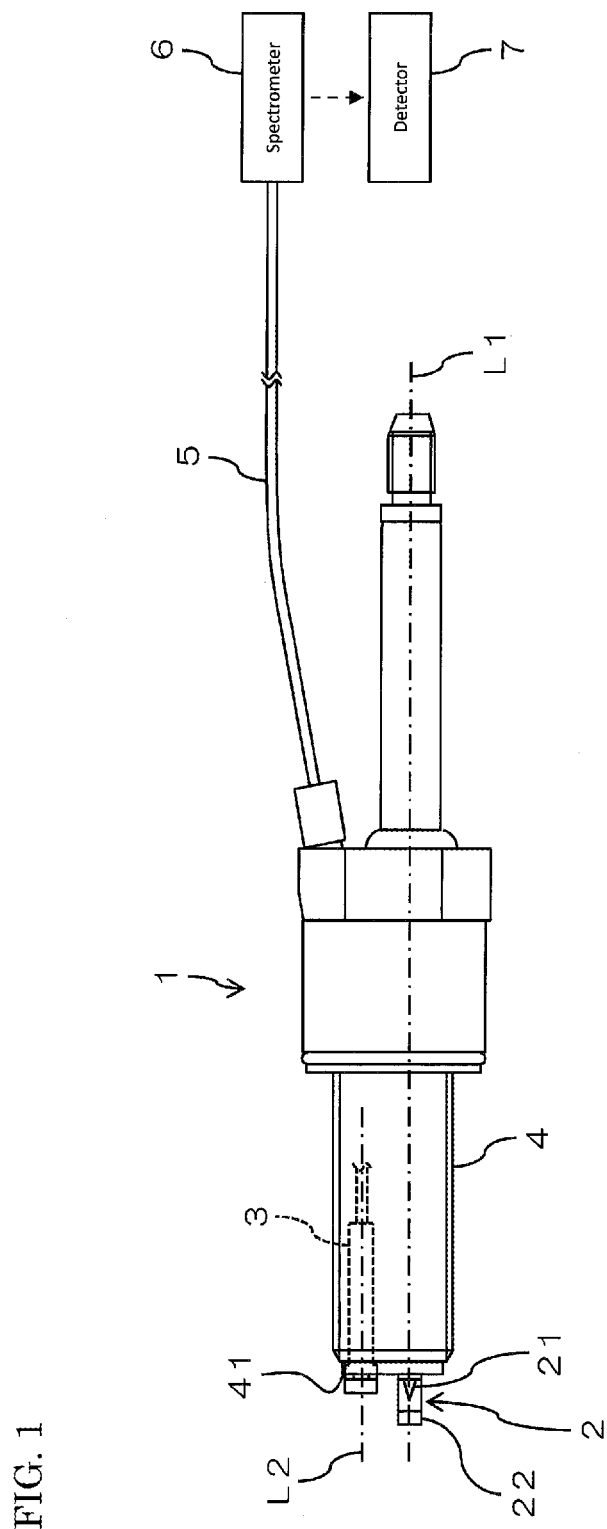
FIG. 1 is a view showing a structure example of an optical measurement device provided with a plug built-in type optical measurement probe according to an embodiment of the present invention.

FIG. 1 is a view showing a structure example of an optical measurement device provided with a plug built-in type optical measurement probe 1 according to an embodiment of the present invention. FIG. 1 shows a schematic side view of a concrete structure of the plug built-in type optical measurement probe 1, and also a block diagram of other structures.

The plug built-in type optical measurement probe 1 according to the present embodiment is for guiding light generated in a high temperature environment to an appliance, and is installed in such a way as to look into a combustion chamber of an internal combustion engine of a car, a motorcycle or the like, and is used at a time of evaluating the combustion state in the combustion chamber, for example. The high temperature environment is an environment of 300° C. or higher, for example, and the plug built-in type optical measurement probe 1 according to the present embodiment is heat-resistant in an environment of 300° C. or higher, and more preferably, 800° C. or higher. Additionally, "heat resistance" here means a property according to which the optical property does not change even in the event of use in a high temperature environment as described above.

This plug built-in type optical measurement probe 1 is structured by a spark section 2 and a light receiving section 3 being integrally held by a plug main body 4. Light received by the light receiving section 3 is guided to a spectrometer 6 via an optical fiber 5, which is an example of a light guide, and light dispersed by the spectrometer 6 is detected by a detector 7. Incidentally, the light guide is not restricted to the optical fiber 5 as long as it is structured to be able to guide light to an appliance.

The spark section 2 is provided with a center electrode 21 linearly protruding from an end face 41 of the plug main body 4, and a side electrode 22 protruding laterally to the center electrode 21 from the end face 41 of the plug main body 4 in an L-shaped manner. The center electrode 21 protrudes from the end face 41 along an axis L1 extending in a longitudinal direction of the plug main body 4. Also, the light receiving section 3 is provided at a position where the side electrode 22 does not come between the light receiving section 3 and the center electrode 21.

With a general spark plug, the center electrode 21 extends along the center axis of the plug main body 4, but according to the plug built-in type optical measurement probe 1 of the present embodiment, to secure a space for holding the light receiving section 3 integrally with the spark section 2 by the plug main body 4, the center electrode 21 extends along the axis L1 that is shifted in parallel to the center axis of the plug main body 4.

The side electrode 22 extends from the end face 41 of the plug main body 4 in the direction of the axis L1, and then, its tip end bends from the plane of paper to the nearside, and protrudes in an L-shaped manner, and thus, its tip end portion faces the tip end of the center electrode 21 with a predetermined gap in the direction of the axis L1. The gap formed along the direction of the axis L1 between the tip end portion of the side electrode 22 and the center electrode 21 is a so-called electrode gap (a plug gap), and is formed to be about 0.5 to 2 mm, for example.

The side electrode 22 is a ground electrode for forming a ground, and applies a high voltage between the center electrode 21 and itself to thereby cause spark discharge between the electrodes and perform ignition. By this ignition by the spark section 2, fuel in the combustion chamber of the internal combustion engine is combusted and combustion gas is generated, and also, light generated at the time of combustion is received by the light receiving section 3.

Figure 2:
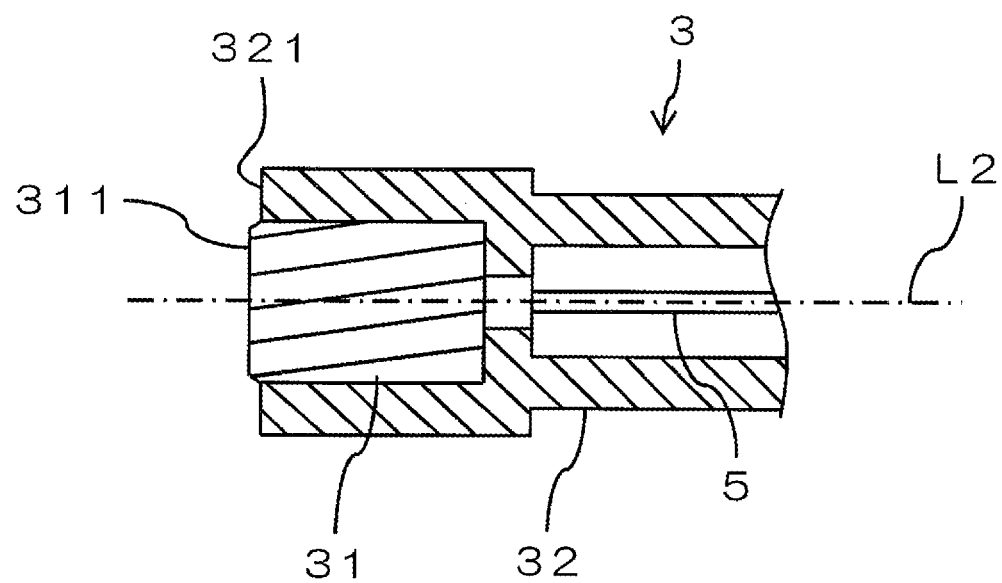
FIG. 2 is a cross-sectional view showing a structure example of a light receiving section.

FIG. 2 is a cross-sectional view showing a structure example of the light receiving section 3. The light receiving section 3 is provided with an optical window 31, a holder 32, and the like, and the tip end portion of the optical fiber 5 is attached to the holder 32. Additionally, in FIG. 2, only the surrounding structures of the optical window 31 of the light receiving section 3 are shown.

The optical window 31 is a transparent member formed of sapphire, for example, and is capable of transmitting, and introducing into the holder 32, light incident on the incidence surface 311. In this example, the optical window 31 is formed to be columnar, and light generated at the time of combustion is to enter from the end face of the optical window 31. The end face of the optical window 31 is formed into a circular shape, for example, and structures the incidence surface 311. However, the optical window 31 is not restricted to be columnar, and the incidence surface 311 is not restricted to be circular, and the optical window 31 may be formed by any other form.

The holder 32 is formed to be cylindrical, for example, and the optical window 31 is accommodated in one end portion of the holder 32. Specifically, a concave portion having an inner diameter corresponding to the outer diameter of the optical window 31 is formed at one end portion of the holder 32, and the optical window 31 is accommodated inside this concave portion. The gap between the inner circumferential surface of the concave portion and the outer circumferential surface of the optical window 31 is sealed by brazing or an O-ring, for example, and the combustion gas generated at the time of combustion is prevented from entering inside the holder 32.

The optical window 31 can be formed using various materials such as quartz, resin, Si, Ge and the like, without being limited to sapphire. For example, in the case where the optical window 31 is formed using sapphire, quartz, or resin, ultraviolet light can be desirably transmitted. Also, in the case where the optical window 31 is formed using Si or Ge, infrared light can be desirably transmitted. Visible light can be desirably transmitted even when the optical window 31 is formed using other various materials.

In the case where the optical window 31 is formed of sapphire, if the holder 32 is formed of Kovar, the optical window 31 may be desirably brazed to the holder 32. However, the holder 32 maybe formed of metals other than Kovar, such as stainless steel or aluminum, or may be formed of materials other than metal. Since an end portion of the optical fiber 5 is accommodated in the holder 32, the holder 32 is desirably formed of a heat-resistant material. Additionally, at the time of attaching the optical window 31 to the holder 32 using an O-ring, restrictions on the materials for forming the holder 32 are reduced. For example, in the case of using an O-ring formed of an elastomeric material such as perfluoro elastomer, the optical window 31 formed of quartz can be desirably attached to the holder 32 formed of stainless steel.

The optical fiber 5 is provided inside the holder 32, extending along a center axis L2 of the holder 32, and the optical window 31 is arranged coaxially and with a slight gap to the optical fiber 5. Thereby, light transmitted through the optical window 31 enters the optical fiber 5 from the end portion, and is guided to an appliance such as the spectrometer 6 through the optical fiber 5. As shown in FIG. 1, the light receiving section 3 is held by the plug main body 4 in such a way that the center axis L2 extends in parallel to the axis L1 of the center electrode 21, and is provided in such a way that the incidence surface 311 of the optical window 31 protrudes from the end face 41 of the plug main body 4.

Additionally, in this example, the incidence surface 311 of the optical window 31 protrudes from an end face 321 of the holder 32 due to the optical window 31 being attached slightly raised from the end face 321 of the holder 32 along the center axis L2. However, this structure is not restrictive, and the incidence surface 311 of the optical window 31 maybe provided to be flush with the end face 321 of the holder 32, for example.

Figure 3:
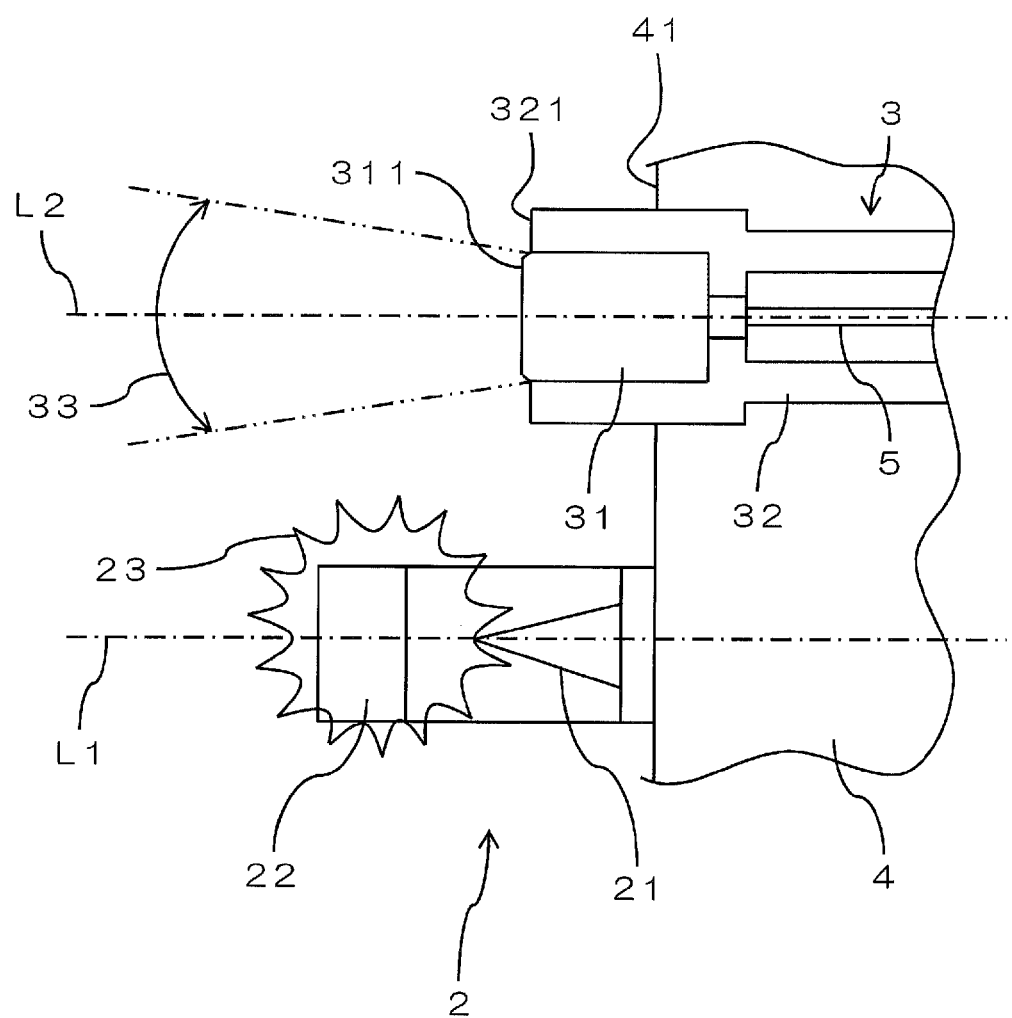
FIG. 3 is a conceptual diagram for describing a mode of arrangement of a spark section and the light receiving section.

FIG. 3 is a conceptual diagram for describing a mode of arrangement of the spark section 2 and the light receiving section 3. As shown in FIG. 3, discharge light (spark light) 23 generated at the spark section 2 spreads to a certain extent, and is generated in such a manner that light leaks outside the spark section 2, for example.

The light receiving section 3 of the present embodiment is capable of receiving light in a field of view 33 that gradually expands from the incidence surface 311 of the optical window 31 along the center axis L2. The field of view 33 is a region of a predetermined view angle or less with the center axis L2 at the center, and the view angle is set to about 15 to 30 degrees, and more preferably, about 23 degrees, for example. The view angle of the light receiving section 3 is dependent on the numerical aperture (NA) of the optical fiber 5 and the shape of the optical window 31, and in the case where the end face of the optical window 31 is flat, as in the present embodiment, coincides with the view angle of the optical fiber 5. For example, in the case of using an optical fiber 5 of CeramOptec, the view angle of the optical fiber 5 is about 13.8 to 64.0 degrees.

The holder 32 is a member with a light blocking property, for example, and prevents light from entering from the outer circumferential surface of the optical window 31 accommodated at the end portion, and only the light from the incidence surface 311 side is to enter the optical window 31. The range of the field of view 33 changes depending on the position of the end face 321 of the holder 32, in addition to the shape of the optical window 31.

According to the present embodiment, the spark section 2 and the light receiving section 3 are held by the plug main body 4 while being arranged next to each other in a protruding manner such that the end face 321 of the holder 32 is arranged at a position where the discharge light 23 from the spark section 2 does not enter the field of view 33 of the light receiving section 3. Accordingly, the light receiving section 3 can be held in a manner protruding from the plug main body 4, and entering of the discharge light 23 from the spark section 2 can be restricted by the holder 32 of the light receiving section 3. That is, by arranging the end face 321 of the holder 32 at a position where the discharge light 23 from the spark section 2 does not enter the field of view 33 of the light receiving section 3, the light receiving intensity of the discharge light 23 from the spark section 2 can be prevented from being added to a measurement value, and it is possible to measure only the light generated at the time of combustion, and thus, a more accurate measurement value can be obtained.

Also, according to the present embodiment, by holding the light receiving section 3 in a manner protruded from the plug main body 4, and by causing the incidence surface 311 of the optical window 31 to protrude from the end face 321 of the holder 32, in the case where dirt is adhered to the incidence surface 311, the dirt can be easily wiped off. Accordingly, maintenance can be performed with ease.

As described above, even if the incidence surface 311 of the optical window 31 is protruded from the end face 321 of the holder 32, the field of view 33 of the light receiving section 3 can be restricted depending on the position of the end face 321 of the holder 32, and thus, entering of the discharge light 23 from the spark section 2 can be desirably restricted, and a more accurate measurement value can be obtained.

Figure 4:
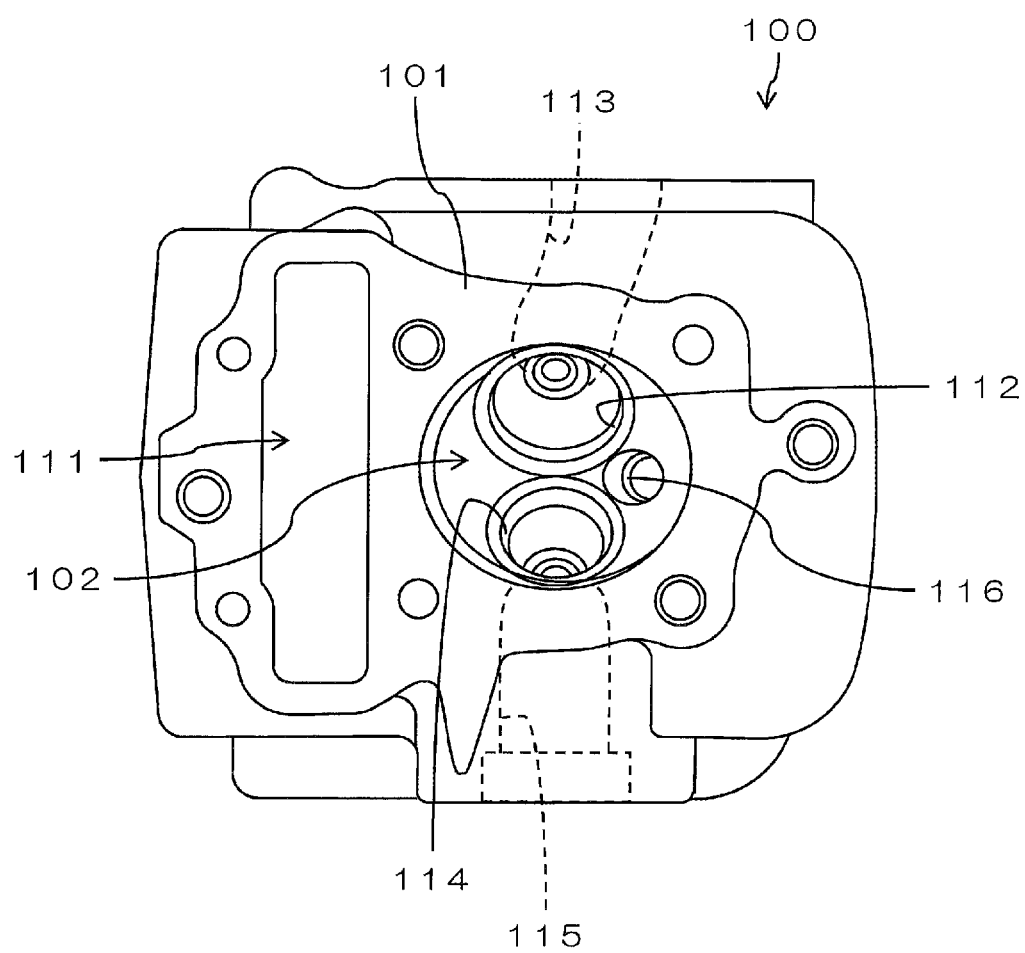
FIG. 4 is a view for describing the attachment position of the plug built-in type optical measurement probe in a cylinder head.

FIG. 4 is a view for describing the attachment position of the plug built-in type optical measurement probe 1 in a cylinder head 101. For example, the cylinder head 101, and a combustion chamber 102 surrounded by a cylinder block and a piston that are not shown are formed in the internal combustion engine 100 of a car or a motorcycle, for example.

The plug built-in type optical measurement probe 1 is attached to the cylinder head 101 in such away as to look into the combustion chamber 102, which is a measurement target, for example. Specifically, a valve system interlocking member accommodation chamber 111 for accommodating a valve system interlocking member (for example, a cam chain or the like), not shown, is formed on the cylinder head 101, and the plug built-in type optical measurement probe 1 is arranged in such a way as to look into the combustion chamber 102 from an opening 116 formed on the opposite side of the valve system interlocking member accommodation chamber 111 across the cylinder center.

An intake port 113 that is communicated with an intake valve opening 112 opened to the combustion chamber 102, and an exhaust port 115 that is communicated with an exhaust valve opening 114 opened to the combustion chamber 102 are formed on the cylinder head 101. In this example, the opening 116 that is open to the combustion chamber 102 is formed near the intake valve opening 112 and the exhaust valve opening 114 of the cylinder head 101, and the plug built-in type optical measurement probe 1 is attached inside the opening 116. Accordingly, for example, at the time of evaluating the combustion state in the combustion chamber 102 of the internal combustion engine 100, light generated in the combustion chamber 102 can be guided to an appliance through the plug built-in type optical measurement probe 1 attached inside the opening 116.

Additionally, the plug built-in type optical measurement probe 1 according to the present invention is not limited to be installed in the combustion chamber 102 of the internal combustion engine 100 of a car, a motorcycle or the like, and can be installed in any high temperature environment to guide light generated at the time of combustion to an appliance.

What is claimed is:

1. A plug built-in type optical measurement probe comprising:
   a spark section for performing ignition by spark discharge between electrodes;
   a light receiving section including an optical window in which light generated at a time of combustion enters through an incidence surface, a light guide in which light transmitted through the optical window enters, and a light-blocking holder in which an end portion of the light guide is provided and holds for holding the optical window at an end portion, the light receiving section being for receiving light, within a field of view, that expands toward out of the light-blocking holder from the incidence surface of the optical window along a center axis of the light-blocking holder, transmitted through the optical window; and
   a plug main body for holding, next to each other, the spark section and the end portion of the light-blocking holder in a protruded position so that the incidence surface is arranged at a position where discharge light from the spark section does not enter the field of view of the light receiving section.

2. The plug built-in type optical measurement probe according to claim 1, wherein the light-blocking holder is formed to be cylindrical, a concave portion having an inner diameter corresponding to an outer diameter of the optical window is formed at one end portion of the holder, and the optical window is accommodated inside the concave portion.

3. The plug built-in type optical measurement probe according to claim 1, wherein the incidence surface of the optical window protrudes from the end face of the light-blocking holder.

4. An optical measurement device comprising:
   the plug built-in type optical measurement probe according to claim 1; and
   a detector for detecting light guided by the plug built-in type optical measurement probe.

5. An optical measurement device, wherein the plug built-in type optical measurement probe according to claim 1 is adapted to be attached to a cylinder head of an internal combustion engine in such a way as to look into a combustion chamber that is a measurement target.

6. The optical measurement device according to claim 5, wherein the plug built-in type optical measurement probe is adapted to be provided in an opening formed on an opposite side, across a cylinder center, from the first side where a valve system interlocking member is accommodated in a valve system interlocking member accommodation chamber provided on the cylinder head.

7. The optical measurement device according to claim 4, wherein the light-blocking holder is formed to be cylindrical, a concave portion having an inner diameter corresponding to an outer diameter of the optical window is formed at one end portion of the holder, and the optical window is accommodated inside the concave portion.

8. The optical measurement device according to claim 4, wherein the incidence surface of the optical window protrudes from the end face of the light-blocking holder.

* * * * *